United States Patent
Yan et al.

(10) Patent No.: US 12,470,409 B2
(45) Date of Patent: Nov. 11, 2025

(54) GENERATE BLOCKCHAIN-BASED USER SECRETS TO AUTHENTICATE USERS TO DECENTRALIZED SERVICES

(71) Applicant: International Business Machines Corporation, Armonk, NY (US)

(72) Inventors: Shunguo Yan, Austin, TX (US); Steven D. Clay, Taylor, TX (US); Michal Broz, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 18/428,339

(22) Filed: Jan. 31, 2024

(65) Prior Publication Data

US 2025/0247257 A1    Jul. 31, 2025

(51) Int. Cl.
| | |
|---|---|
| H04L 29/06 | (2006.01) |
| G06F 40/40 | (2020.01) |
| H04L 9/00 | (2022.01) |
| H04L 9/32 | (2006.01) |

(52) U.S. Cl.
CPC ............ *H04L 9/3271* (2013.01); *G06F 40/40* (2020.01); *H04L 9/3226* (2013.01); *H04L 9/50* (2022.05)

(58) Field of Classification Search
None
See application file for complete search history.

(56) References Cited

U.S. PATENT DOCUMENTS

| | | |
|---|---|---|
| 8,245,283 B2 | 8/2012 | Dawson et al. |
| 8,812,319 B2 | 8/2014 | Skerpac |
| 9,940,934 B2 | 4/2018 | Sachdev et al. |

(Continued)

FOREIGN PATENT DOCUMENTS

| | | |
|---|---|---|
| CN | 108768988 B | 1/2021 |
| CN | 111859348 B | 7/2022 |

(Continued)

OTHER PUBLICATIONS

Gartner Research, "Drive Seamless Digital Customer Experiences With Composable UX," copyright 2024 Gartner, Inc., published Oct. 26, 2021, accessed Jan. 31, 2024, 6 pages, https://www.gartner.com/en/documents/4007527.

(Continued)

*Primary Examiner* — Andrew J Steinle
(74) *Attorney, Agent, or Firm* — Yee & Associates, P.C.

(57) ABSTRACT

User authentication is provided. A most recent user secret block of a set of unprocessed user secret blocks corresponding to a user is retrieved from a blockchain. The user is challenged using a question and answer pair contained in the most recent user secret block of the set of unprocessed user secret blocks corresponding to the user. It is determined whether the user successfully passed the challenge using the question and answer pair contained in the most recent user secret block of the set of unprocessed user secret blocks corresponding to the user. The user is authenticated to access a decentralized service in response to determining that the user did successfully pass the challenge using the question and answer pair contained in the most recent user secret block of the set of unprocessed user secret blocks corresponding to the user. The user is allowed to access the decentralized service.

20 Claims, 7 Drawing Sheets

(56) References Cited

U.S. PATENT DOCUMENTS

| | | |
|---|---|---|
| 10,079,819 B2 | 9/2018 | Nathan et al. |
| 10,417,405 B2 | 9/2019 | Cheyer et al. |
| 10,482,228 B2 | 11/2019 | Welsh et al. |
| 10,503,469 B2 | 12/2019 | Rutherford et al. |
| 10,803,160 B2 | 10/2020 | Tussy |
| 10,972,274 B2 | 4/2021 | Redpath et al. |
| 11,201,746 B2 | 12/2021 | Ranganathan |
| 11,222,099 B2 | 1/2022 | Pham |
| 11,409,861 B2 | 8/2022 | Bolimovsky |
| 11,539,526 B2 | 12/2022 | Channa et al. |
| 11,582,234 B2 | 2/2023 | Park et al. |
| 11,621,959 B2 | 4/2023 | Salkintzis |
| 11,651,362 B2 | 5/2023 | Madisetti et al. |
| 11,665,147 B2 | 5/2023 | Weimer et al. |
| 2003/0105959 A1 | 6/2003 | Matyas et al. |
| 2019/0036680 A1* | 1/2019 | Sundaresan ............... H04L 9/30 |
| 2019/0392489 A1* | 12/2019 | Tietzen ............... G06Q 20/387 |
| 2020/0042643 A1 | 2/2020 | Carrier et al. |
| 2021/0390548 A1 | 12/2021 | Malik et al. |
| 2022/0004617 A1 | 1/2022 | Irwin, III |
| 2022/0174059 A1 | 6/2022 | Fields et al. |
| 2022/0286346 A1 | 9/2022 | Evans |
| 2023/0100422 A1* | 3/2023 | Jakobsson ............. G06Q 50/16 705/67 |
| 2023/0127913 A1 | 4/2023 | Khan et al. |

FOREIGN PATENT DOCUMENTS

| | | |
|---|---|---|
| CN | 111699665 B | 3/2023 |
| JP | 2015517261 A | 6/2015 |
| KR | 102010776 B1 | 10/2019 |
| WO | 2021017427 A1 | 2/2021 |
| WO | 2022045419 A1 | 3/2022 |
| WO | 2022174122 A1 | 8/2022 |

OTHER PUBLICATIONS

Ouaddah, et al., "FairAccess: a new Blockchain-based access control framework for the Internet of Things," Security and Communication Networks 2016, Feb. 19, 2017, pp. 5943-5964, Wiley Online Library, accessed Jan. 30, 2024, https://onlinelibrary.wiley.com/doi/epdf/10.1002/sec.1748.

Ouda, "A framework for next generation user authentication," 2016 3rd MEC International Conference on Big Data and Smart City (ICBDSC), 2016, pp. 1-4, IEEE, accessed Jan. 30, 2024, https://ieeexplore.ieee.org/document/7460349.

Rehman, et al., "Natural Language Voice based Authentication Mechanism for Smartphones (poster)," MobiSys '19: Proceedings of the 17th Annual International Conference on Mobile Systems, Applications, and Services, Jun. 2019, pp. 600-601, ACM Digital Library, accessed Jan. 30, 2024, https://dl.acm.org/doi/10.1145/3307334.3328645.

Rouhani, et al., "Blockchain based access control systems: State of the art and challenges," WI '19: IEEE/WIC/ACM International Conference on Web Intelligence, Oct. 4, 2019, ACM Digital Library, accessed Jan. 30, 2024, https://dl.acm.org/doi/abs/10.1145/3350546.3352561.

Voege, et al., "A Study on Natural Language Chatbot-based Authentication Systems," 2021 International Symposium on Networks, Computers and Communications (ISNCC), 2021, pp. 104, IEEE, accessed Jan. 30, 2024, https://ieeexplore.ieee.org/document/9615767.

* cited by examiner

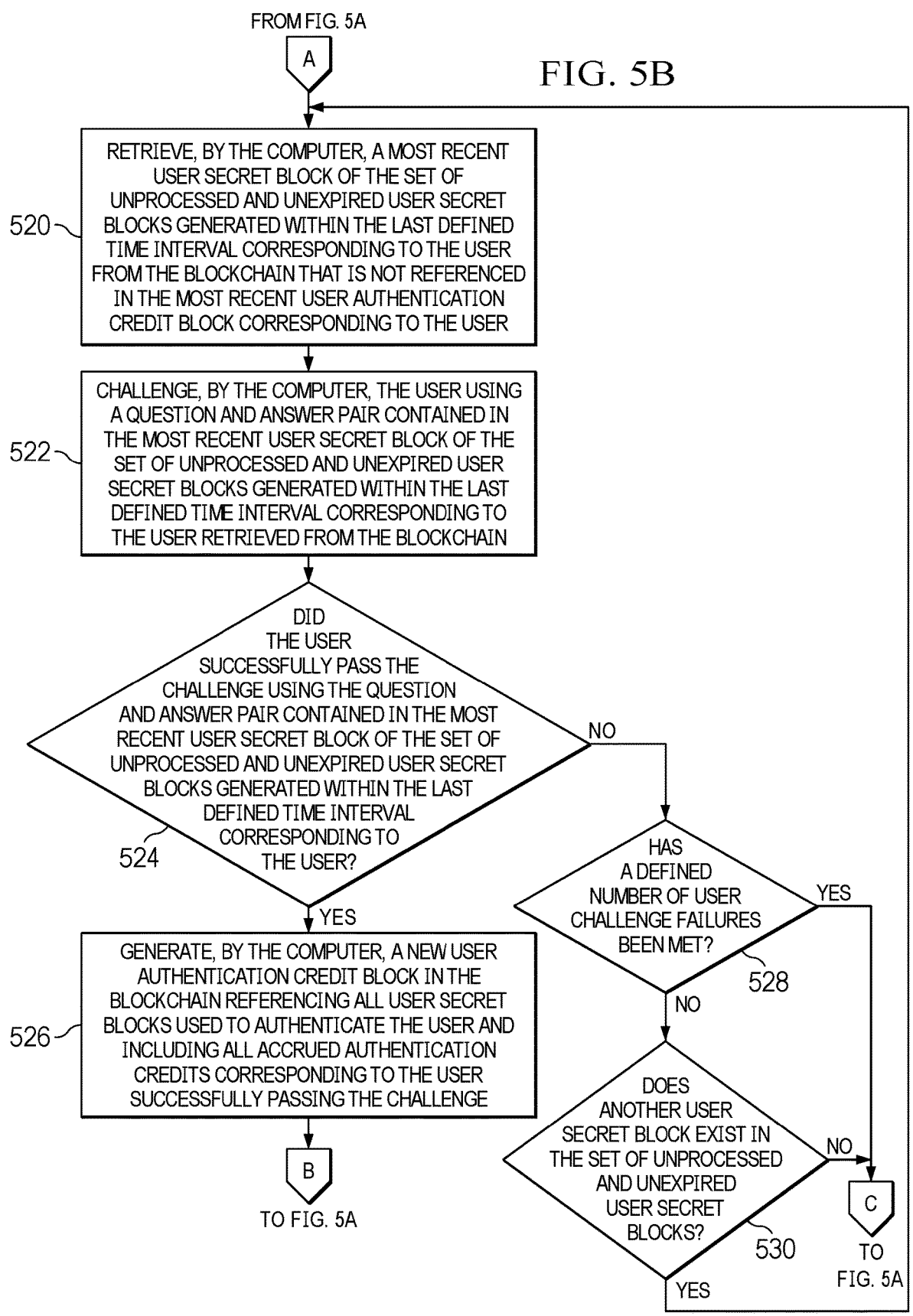

GENERATE BLOCKCHAIN-BASED USER SECRETS TO AUTHENTICATE USERS TO DECENTRALIZED SERVICES

BACKGROUND

The disclosure relates generally to user authentication and more specifically to authenticating users to decentralized services.

User authentication is a security process that prevents unauthorized users from accessing, for example, secure devices, networks, applications, services, data, and the like. User authentication typically involves a login procedure where access credentials, such as, for example, username and password, are requested to grant authorized access. If an unauthorized user lacks the proper login credentials, user authentication fails. User authentication is important because it helps individuals, organizations, enterprises, businesses, companies, institutions, agencies, and the like protect their systems, data, networks, websites, applications, and the like from unauthorized access and attack.

SUMMARY

According to one illustrative embodiment, a computer-implemented method for user authentication is provided. A computer retrieves a most recent user secret block of a set of unprocessed and unexpired user secret blocks generated within a last defined time interval corresponding to a user from a blockchain. The computer challenges the user using a question and answer pair contained in the most recent user secret block of the set of unprocessed and unexpired user secret blocks generated within the last defined time interval corresponding to the user retrieved from the blockchain. The computer determines whether the user successfully passed the challenge using the question and answer pair contained in the most recent user secret block of the set of unprocessed and unexpired user secret blocks generated within the last defined time interval corresponding to the user. The computer authenticates the user to access a decentralized service in response to the computer determining that the user did successfully pass the challenge using the question and answer pair contained in the most recent user secret block of the set of unprocessed and unexpired user secret blocks generated within the last defined time interval corresponding to the user. The computer allows the user to access the decentralized service in response to the computer authenticating the user. According to other illustrative embodiments, a computer system and computer program product for user authentication are provided.

BRIEF DESCRIPTION OF THE DRAWINGS

FIGS. 5A-5B are a flowchart illustrating a process for user authentication in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
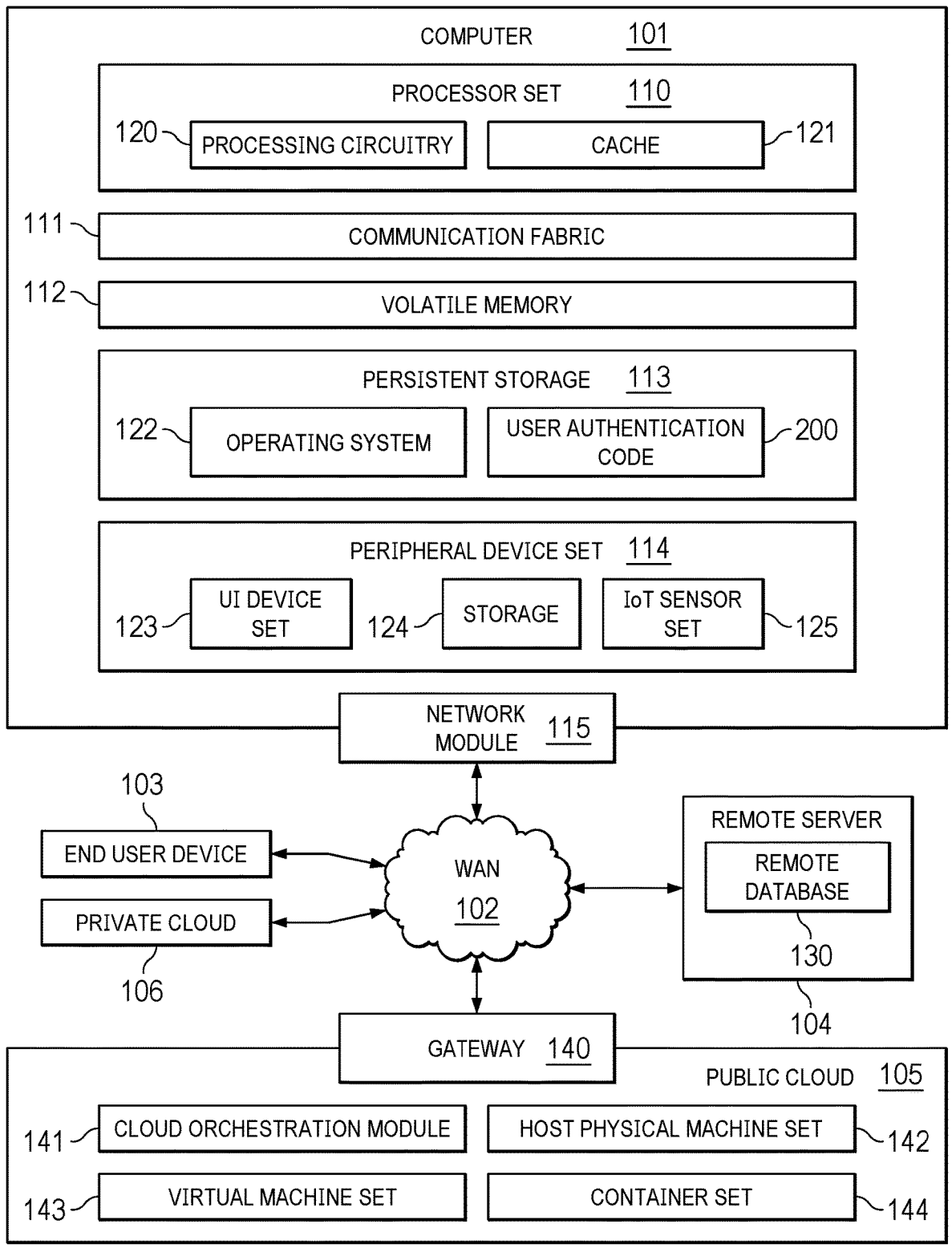
FIG. 1 is a pictorial representation of a computing environment in which illustrative embodiments may be implemented.
Figure 2:
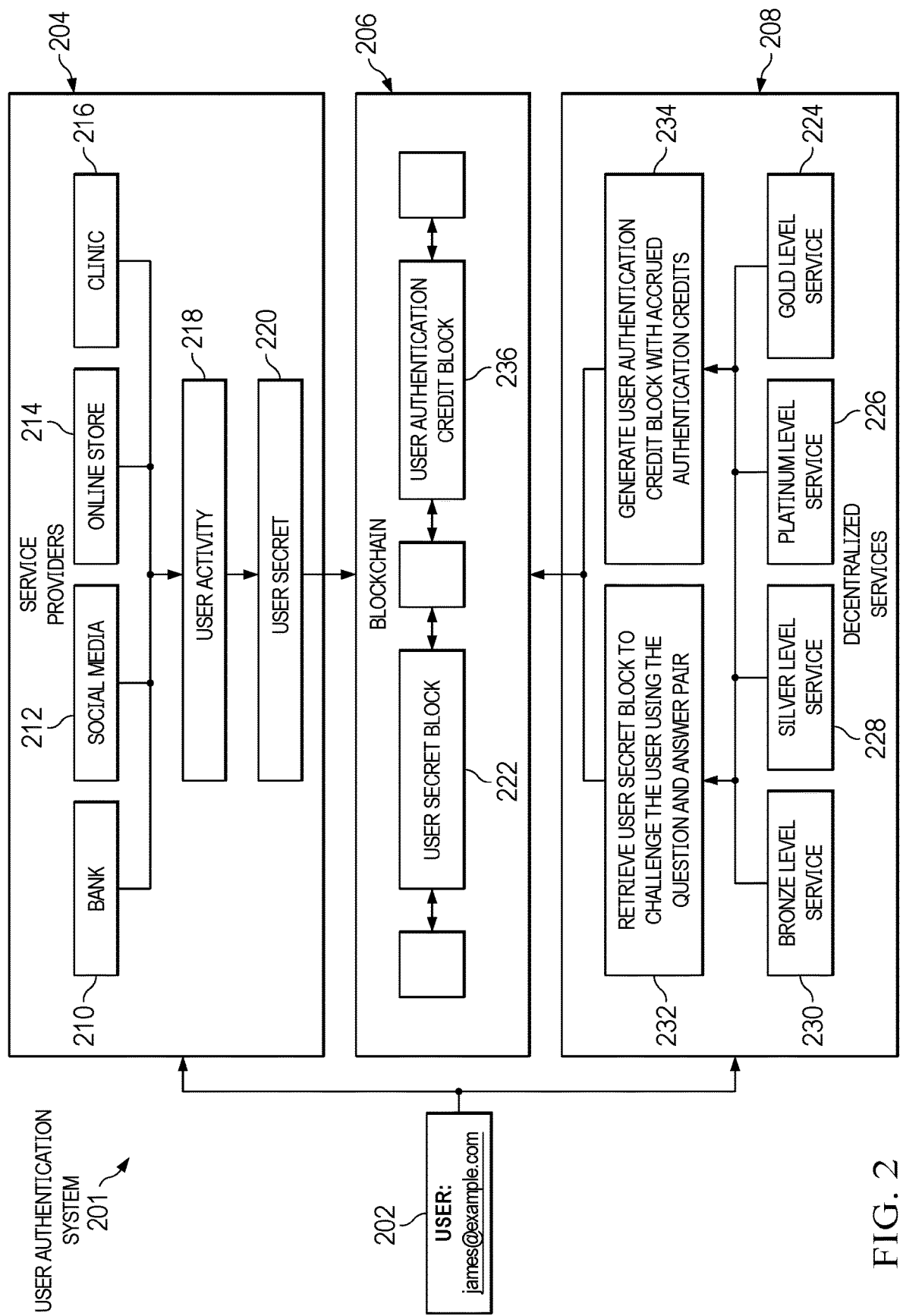
FIG. 2 is a diagram illustrating an example of a user authentication system in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as user authentication code 200. For example, user authentication code 200 utilizes a blockchain to store dynamically generated user secrets (question and answer pairs) corresponding to a user based on recent user activities (e.g., online transactions) of the user and use the generated user secrets to authenticate the user to a decentralized service, such as, for example, a metaverse, Web3, spatial computing, or the like. User authentication code 200 utilizes the user secrets recorded in the blockchain to authenticate the user to any decentralized service without the user having to pre-register any credentials in the blockchain. For example, as the user is logging in to access a service of an online retailer, user authentication code 200 randomly selects a generated question and answer pair corresponding to a previous user activity by the user with that online retailer from the blockchain to authenticate the user to the service. Alternatively, user authentication code 200 can select a question and answer pair generated from a user activity corresponding to another service provider to authenticate the user to the service of the online retailer. Thus, user authentication code 200 decreases the risk or likelihood of success for an unauthorized user to obtain information that can be used to access the service or user account.

In addition to user authentication code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and user authentication code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in user authentication code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a user of the services corresponding to the service provider that operates computer 101), and may take any of the forms discussed above in connection with computer 101. EUD 103 typically receives helpful and useful data from the operations of computer 101. For example, in a hypothetical case where computer 101 is designed to provide a user authentication outcome (e.g., success or fail) to the end user, this user authentication outcome would typically be communicated from network module 115 of computer 101 through WAN 102 to EUD 103. In this way, EUD 103 can display, or otherwise present, the user authentication outcome to the end user. In some embodiments, EUD 103 may be a client device, such as thin client, heavy client, mainframe computer, desktop computer, laptop computer, tablet computer, smart phone, smart watch, and so on.

Remote server 104 is any computer system that serves at least some data and/or functionality to computer 101. Remote server 104 may be controlled and used by the same service provider that operates computer 101. Remote server 104 represents the machine(s) that collect and store helpful and useful data for use by other computers, such as computer 101.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Emerging enterprise ecosystems or digital economies (e.g., physical or three-dimensional digital virtual spaces, such as, the metaverse, Web3, spatial computing, or the like) will consist mostly of decentralized services or components, which are created by multiple users not within the same system. As a result, the number of user service touchpoints will continue to grow over time. This can cause a disconnect in the user experience, difficulties for the end users, and increase costs.

These emerging technologies promise a consistent and seamless user experience in accessing decentralized services or components. In such emerging technologies, users interact with digital content from any capable electronic device, beyond the sense of sight. Voice commands, eyebrow movements, head positions, hand waves, and the like, will become the mainstream of communication in these emerging technologies similar to the way they are used in the physical world. In addition, different decentralized services may have different security requirements. For example, some decentralized services may need just a basic authentication, while other decentralized services may be more sensitive and need stronger authentication. Therefore, user authentication to decentralized services should be immersed seamlessly in the content processing.

Decentralized services have posed a challenge to existing authentication mechanisms. As an example, multi-factor authentication from a centralized identity provider involves multiple, disparate steps to access secure systems, which leads to a decreased user experience. For example, a user may need to remember multiple passwords to different services, increasing the likelihood of passwords being forgotten, stolen, manipulated, or misappropriated. In addition, passwords are not meant for voice authentication. As another example, blockchain authentication uses public-key cryptography via a digital wallet or an application having the corresponding private-key. Similar to a password, a digital wallet or an electronic device can be forgotten, stolen, or misappropriated. In addition, a user is limited to using the electronic device with the digital wallet. This breaks the promise of ubiquitous access for an emerging technology such as the metaverse. As yet another example, existing voice-based authentication, such as chatbot-based authentication, utilizes a user security profile to generate a question and predict the appropriate user response. Voice-based authentication is often used as a secondary authentication mechanism to complement passwords. However, existing voice-based authentication does not provide a way to differentiate between different levels of security requirements corresponding to different services. Moreover, the security profile is usually generated and stored in a centralized server. As a result, an unauthorized or malicious user can potentially misappropriate the security profile.

Illustrative embodiments take into account and address the issues associated with current authentication mechanisms noted above. Illustrative embodiments provide a user authentication solution that can be utilized as a complement to existing authentication mechanisms to access decentralized services (e.g., metaverse, Web3, spatial computing, and the like). Illustrative embodiments utilize a permission-based blockchain that is adapted to store user secrets. A user secret is a question and answer pair which was generated from a previous user activity (e.g., a loan request). Each question and answer pair is also assigned an authentication credit value according to the question and answer pair's sensitivity or confidentiality to the user. For example, the more sensitive or confidential, the more likely only the user knows the answer to the question, the higher the authentication credit value. Illustrative embodiments only replicate the blockchain with authorized service providers and decentralized services, but not with users. As a result, the user secrets contained in the blockchain are more secure and free from misappropriation.

Illustrative embodiments generate the user secrets using natural language processing. Illustrative embodiments generate the user secrets based on recent user activities, such as, for example, user transactions in services provided by service providers. Alternative illustrative embodiments generate user secrets based on users' activities recorded in other private blockchains. The service providers store each of the generated user secrets in the blockchain as a block. An authorized or registered decentralized service utilizes a most recent user secret (a question and answer pair) selected from the blockchain to challenge a user with the question from the selected question and answer pair and then compares the user's answer to the answer contained in the selected question and answer pair to determine whether the answers match. If the user answers the question correctly, illustrative embodiments accrue the authentication credit value for the question and answer pair to the user. After the user answers a certain number of questions correctly, the accrued authentication credit value satisfies a particular decentralized service for a certain level of trust needed, illustrative embodiments then authenticate the user to the particular decentralized service. Likewise, a decentralized service may deny the user if a particular number of questions are answered incorrectly before a needed authentication credit value is reached.

For an activity performed by a user corresponding to a service of a service provider, the service provider generates the user secret (i.e., the question and answer pair) corresponding to the user using natural language processing. A service provider may generate a user secret per each user activity, or multiple user secrets from one user activity, or one user secret from a combination of multiple user activities. Service providers can generate user secrets on a continuous basis, on a predetermined time interval basis, or as needed. User secrets are intended to be rotated rapidly. In addition, user secrets can include an expiration time. The service provider also assigns an authentication credit value to the question and answer pair according to the sensitivity or confidentiality to the user. After generating a user secret, expiration, and authentication credit value, the service provider presents the question and answer pair of the generated user secret to the user for verification by the user that the question and answer pair is correct or accurate. In addition, the user assigns a passcode to the user secret after verification. A user may use a different passcode for each user secret or use the same passcode for multiple user secrets generated by different service providers, and then rotate the passcode after a certain amount of time. In response to receiving the verification from the user that the question and answer pair is appropriate, the service provider generates a blockchain block with the user secret, passcode, expiration, authentication credit value, and any associated user activity record. The service provider then stores the generated blockchain block, which contains the user secret, passcode, expiration, authentication credit value, and any associated user activity record, in the blockchain.

In response to receiving a user request for accessing a decentralized service, the decentralized service selects a group of most recent user secret blocks corresponding to the requesting user from the blockchain. The group of most recent user secret blocks were generated within a predefined time interval, such as, for example, the last five days, unexpired if an expiration time were specified in the secret blocks, and have not yet been used to authenticate the user. Based on the information contained in a selected user secret block from the group, the decentralized service challenges the user with the question in the selected user secret block and determines whether the user's answer matches the answer in the selected user secret block. Once user authentication is completed, the decentralized service generates a user authentication credit block, which records the accrued authentication credits for the user, and stores the user authentication credit block in the blockchain. It should be noted that another decentralized service can use the user authentication credit block created within a predefined time period, for example, the last twelve hours, for authenticating the user in a subsequent service request corresponding to the other decentralized service if the accrued authentication credits are greater than or equal to a defined minimum number of accrued authentication credits for the requested service, or continue to challenge the user with the questions from the most recent secret blocks that haven't been used during the previous authentication until the needed accrued authentication credit is reached.

As a result, user authentication by illustrative embodiments can be seamlessly immersed in the content processing with voice to provide a consistent user experience for decentralized services or components in emerging technologies, such as, for example, the metaverse, Web3, spatial computing, or the like. Further, illustrative embodiments can generate dynamic user secrets that can be continuously rotated. Furthermore, illustrative embodiments do not store any user secrets in a user's device to enable universal access with any capable electronic device (e.g., public device, friend's device, work device, or the like). Moreover, illustrative embodiments support a plurality of different security levels corresponding to different services.

It should be noted that the user authentication of illustrative embodiments can be complementary to the existing user authentication mechanisms. For example, a user can initially use an existing user authentication mechanism (e.g., password, public-key cryptography, or the like) to access a decentralized service corresponding to an authorized service provider. After the user has achieved a certain level of trust or reputation with the authorized decentralized service or a service provider (e.g., the authorized service provider has generated a defined minimal number of user secrets corresponding to the user) or the user has more than a predefined number of the secrets stored in the blockchain from multiple service providers, the authorized decentralized service can start to utilize the user authentication of illustrative embodiments to authenticate the user to the decentralized service. In addition, the authorized decentralized service can utilize the user authentication of illustrative embodiments for less sensitive services when the user's accrued credits are not sufficient for more sensitive services.

The user authentication of illustrative embodiments either fails or succeeds based on accrued credits. In one illustrative embodiment, if a user fails to correctly answer a security challenge question, then illustrative embodiments select the next security challenge question. In another illustrative embodiment, the failed security challenge questions are also recorded in the blockchain. User authentication fails if a threshold number of user authentication attempts is reached (e.g., a maximum threshold number of security challenge questions have not been answered correctly by the user).

In this user authentication of illustrative embodiments, authorized service providers consistently perform user authentication for different decentralized services from the same blockchain. Moreover, no user authentication information is stored on a user's device.

Thus, illustrative embodiments provide one or more technical solutions that overcome a technical problem with an inability of current user authentication mechanisms to authenticate users to decentralized services using security challenge questions and correct answers or accrued user authentication credits contained in blocks of a private permission-based blockchain only accessible by authorized service providers and decentralized services. As a result, these one or more technical solutions provide a technical effect and practical application in the field of user authentication.

With reference now to FIG. 2, a diagram illustrating an example of a user authentication system is depicted in accordance with an illustrative embodiment. User authentication system 201 may be implemented in a computing environment, such as computing environment 100 in FIG. 1.

User authentication system 201 is a system of hardware and software components for utilizing a blockchain in a variety of ways to authenticate a user. For example, user authentication system 201 can grant a group of authorized or trusted service providers and decentralized services access permission to the blockchain to access user secret blocks (e.g., through cryptographic technologies). Alternatively, user authentication system 201 can provide each service with its own blockchain in which all service providers and decentralized services have permission to access. In each alternative above, the service providers have access to the blockchain to generate user secrets, and decentralized services also have access to the blockchain to utilize user secrets and authentication blocks and can generate additional authentication blocks as well.

In this illustrative example, user authentication system 201 includes user 202, service providers 204, blockchain 206, and decentralized services 208. However, it should be noted that user authentication system 201 is intended as an example only and not as a limitation on illustrative embodiments. For example, user authentication system 201 can include any number of users, service providers, blockchains, decentralized services, and other components and devices not shown. For example, user 202 utilizes a client device, such as EUD 103 in FIG. 1, to connect to and communicate with service providers 204 and decentralized services 208 via a network, such as WAN 102 in FIG. 1. Similarly, service providers 204 and decentralized services 208 utilize computers, such as computer 101 in FIG. 1, to process access requests and communicate with user 202. It should be noted that a decentralized service of decentralized services 208 may be provided by a service provider of service providers 204. In this case, the service provider generates user secrets and also utilizes user secrets generated by itself and other service providers to authenticate the user. Alternatively, a decentralized service may not be provided by any of service providers 204 who generates user secrets, but only utilizes the user secrets generated by other service providers to authenticate the user.

Service providers 204 represent a group of authorized or trusted service providers granted access permission to blockchain 206 to access user secrets blocks. In this example, service providers 204 include service provider 210 (e.g., bank), service provider 212 (e.g., social media), service provider 214 (e.g., online store), and service provider 216 (e.g., clinic). Blockchain 206 is a private permission-based blockchain only accessible by service providers 204 and decentralized services 208. User 202 starts by accessing a platform of service provider 210 (e.g., bank) using a login identifier and password established separately with service provider 210 initially or subsequently utilizing user secrets once user 202 has a sufficient number of secret blocks in blockchain 206 to perform user activity 218 (e.g., bank account transfer). Service provider 210 generates user secret 220 (i.e., a question and answer pair) based on user activity 218. Service provider 210 then asks user 202 to verify user secret 220 and assign a passcode. Upon receiving verification of user secret 220 from user 202, service provider 210 generates user secret block 222 in blockchain 206.

Subsequently, user 202 wants to access gold level service 224 of decentralized services 208, which also includes platinum level service 226, silver level service 228, and bronze level service 230, via a metaverse, Web3, or the like. At 232, gold level service 224 retrieves user secret block 222, which is the most recent and unexpired user secret block, from blockchain 206 to challenge user 202 using the question and expects to receive the answer from the user corresponding to user secret 220, which was based on user activity 218 previously performed by user 202. If the answer provided by user 202 matches the answer retrieved from the user secret, the challenge is successful, and gold level service 224 accrues the authentication credit for the question and answer pair corresponding to user secret 220 to user 202. If the authentication credit value is less than a minimal authentication credit value needed to access gold level service 224, gold level service 224 retrieves the second most recent unexpired user secret block from blockchain 206 to challenge user 202. This process continues until the accrued authentication credit value is greater than or equal to the minimum authentication credit value needed to access gold level service 224 and user 202 is authenticated successfully. At 234, upon successful authentication of user 202, gold level service 224 generates user authentication credit block 236 with the accrued authentication credit value in blockchain 206. Afterward, another decentralized service (e.g., bronze level service 230) can retrieve user authentication credit block 236, generated within a predefined time period (e.g., the last twelve hours) to authenticate user 202 based on the accrued authentication credit value recorded in user authentication credit block 236. Authentication of user 202 succeeds if the accrued authentication credit value recorded in user authentication credit block 236 is greater than or equal to the minimum authentication credits needed to access bronze level service 230, which in this example they are because the accrued authentication credits for gold level service 224 are greater than the credits needed to access bronze level service 230. Otherwise, if authentication fails, then bronze level service 230 challenges user 202 with a new security challenge question retrieved from a different user secret block in blockchain 206.

Figure 3:
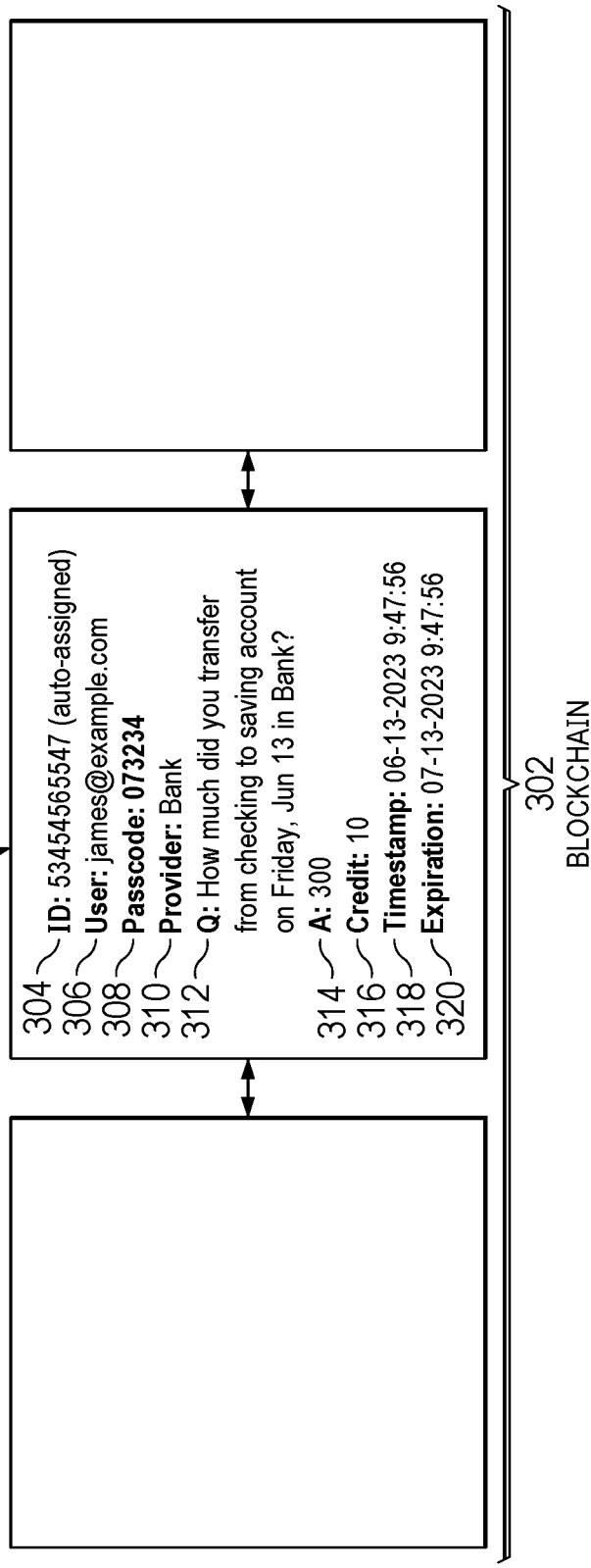
FIG. 3 is a diagram illustrating an example of a user secret block in accordance with an illustrative embodiment.

With reference now to FIG. 3, a diagram illustrating an example of a user secret block is depicted in accordance with an illustrative embodiment. User secret block 300 is located in blockchain 302. Blockchain 302 may be, for example, blockchain 206 in FIG. 2. User secret block 300 may be, for example, user secret block 222 in FIG. 2.

In this example, user secret block 300 contains block identifier 304, user identifier 306, passcode 308, service provider identifier 310, security challenge question 312, correct answer 314, credit 316, timestamp 318, and expiration 320. Block identifier 304 uniquely identifies user secret block 300 in blockchain 302. User identifier 306 uniquely identifies the user who corresponds to user secret block 300. The user may be, for example, user 202 in FIG. 2.

Passcode 308 is a passcode assigned by the user when the service provider generates a user secret, such as, for example, user secret 220 in FIG. 2. The user utilizes user identifier 306 and passcode 308 to initially access a decentralized service, such as, for example, one of decentralized services 208 in FIG. 2, with passcode 308 as an additional mechanism to discourage denial of service attacks. Service provider identifier 310 uniquely identifies the service provider, such as service provider bank 210 of service providers 204 in FIG. 2, that generated user secret block 300. The service provider is an authorized or registered service provider and in this example is a bank. However, the service provider can be any type of service provider, such as, for example, an online store, social media platform, or the like.

The service provider generated security challenge question 312 and correct answer 314 to security challenge question 312 in natural language based on a recent activity performed by the user, such as, for example, user activity 218 in FIG. 2, in a service of the service provider using natural language processing. The user verified security challenge question 312, correct answer 314, and assigned passcode 308 prior to the service provider including security challenge question 312, correct answer 314, and passcode 308 in user secret block 300. The user can also optionally provide expiration 320. Expiration 320 is an expiration time when user secret block 300 should no longer be used for user authentication after the expiration time has expired. Expiration 320 can be any time interval, such as, for example, 1 hour, 12 hours, 1 day, 3 days, 1 week, 2 weeks, 1 month, or any other increment of time.

Credit 316 is a weighted authentication credit value that depends on the level of sensitivity or confidentiality associated with security challenge question 312. For example, a security challenge question generated based on the user performing a banking transaction has a greater weight than a security challenge question generated based on the user uploading a landscape picture to a social media platform because the former user activity is more sensitive. The service provider associated with service provider identifier 310 adds the user verified user secret associated with user identifier 306 as a block in blockchain 302. Timestamp 318 identifies when the service provider added user secret block 300 to blockchain 302.

Figure 4:
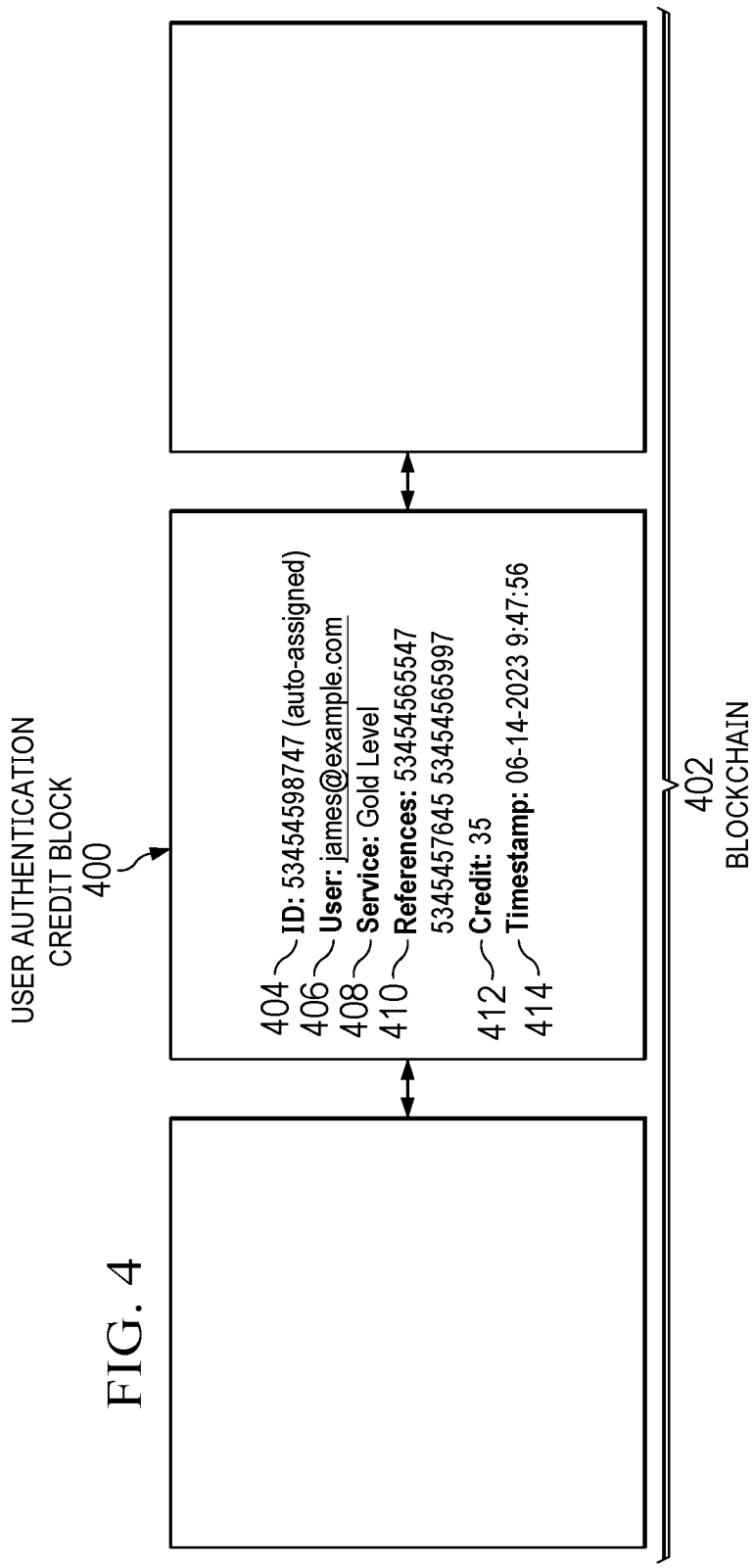
FIG. 4 is a diagram illustrating an example of a user authentication credit block in accordance with an illustrative embodiment.

With reference now to FIG. 4, a diagram illustrating an example of a user authentication credit block is depicted in accordance with an illustrative embodiment. User authentication credit block 400 is located in blockchain 402. Blockchain 402 may be, for example, blockchain 302 in FIG. 3. User authentication credit block 400 may be, for example, user authentication credit block 236 in FIG. 2. User authentication credit block 400 records references to a set of user secret blocks used to authenticate a user to access decentralized services and the associated accrued authentication credit value.

In this example, user authentication credit block 400 contains block identifier 404, user identifier 406, decentralized service identifier 408, references 410, credit 412, and timestamp 414. Block identifier 404 uniquely identifies user authentication credit block 400 in blockchain 402. User identifier 406 uniquely identifies the user who corresponds to user authentication credit block 400. The user may be, for example, user 202 in FIG. 2. Decentralized service identifier 408 uniquely identifies the decentralized service, such as one of decentralized services 208 in FIG. 2, that generated user authentication credit block 400. In this example, the decentralized service is a gold level service. It should be noted that the authentication credit value in the most recent user authentication credit block is accrued from all the decentralized services that authenticated the user within a predefined time period, for example, the last twelve hours. The decentralized service generates user authentication credit block 400 after the user is successfully authenticated to access that particular decentralized service.

References 410 identify a set of user secret block identifiers that correspond to a set of user secret blocks that the decentralized services used to challenge the user during the authentication to access that the decentralized services. It should be noted that the references in the most recent user authentication credit block include all the references to the user secret blocks that were used for user authentication (or the authentication credits for the user secrets already taken) by decentralized services within a predefined time period (e.g., the last twelve hours). In this example, references 410 identify 3 user secret block identifiers, such as, for example, block identifier 304 of user secret block 300 in FIG. 3.

Credit 412 represents the accrued or accumulated number of authentication credits associated with the security challenge questions asked from the set of user secrets corresponding to the user secret blocks referenced in references 410 that were used to challenge the user. Timestamp 414 identifies when the decentralized service added user authentication credit block 400 to blockchain 402.

Decentralized services can utilize user authentication credit block 400 to track the accrued or accumulated authentication credits if user authentication credit block 400 was generated within a predefined time period (e.g., the last twelve hours) for progressive user authentication to satisfy the different security needs of different decentralized service levels. For example, a decentralized service would not need to challenge the user for a subsequent service request to the same service, such as, for example, gold level service 224 in FIG. 2, or to a different service, such as, for example, bronze level service 230 in FIG. 2, needing the same or a lesser number of accrued authentication credits based on the authentication credits already recorded in user authentication credit block 400.

Figure 5A:
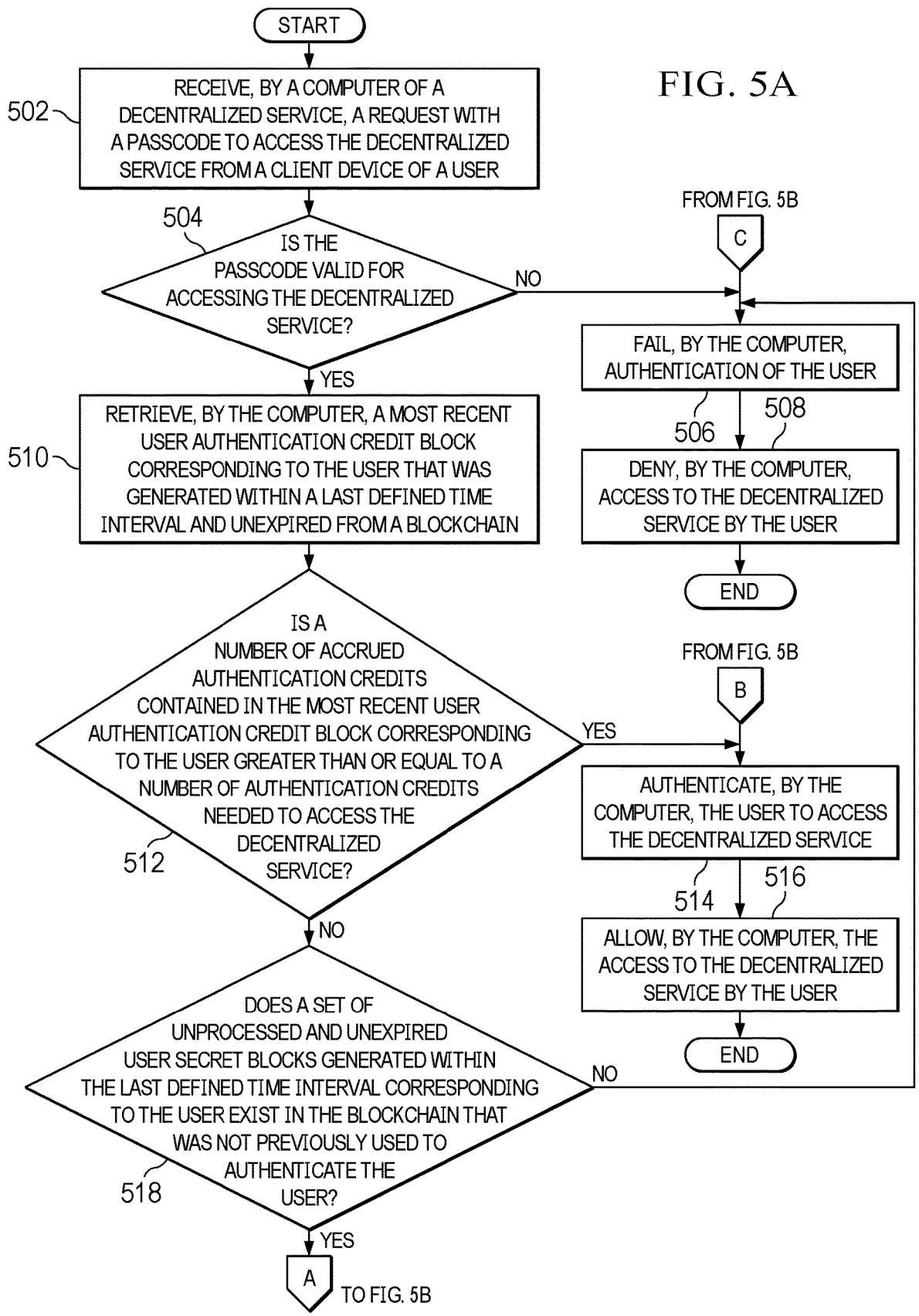

With reference now to FIGS. 5A-5B, a flowchart illustrating a process for user authentication is shown in accordance with an illustrative embodiment. The process shown in FIGS. 5A-5B may be implemented in a computer, such as, for example, computer 101 in FIG. 1. For example, the process shown in FIGS. 5A-5B may be implemented in user authentication code 200 in FIG. 1.

The process begins when the computer of a decentralized service receives a request with a passcode to access the decentralized service from a client device of a user (step 502). The computer makes a determination as to whether the passcode is valid for accessing the decentralized service (step 504). It should be noted that the user may assign multiple passcodes in user secrets generated by a service provider or multiple service providers. A match to any one of the passcodes, assigned within a last defined time interval (e.g., the last five days), is considered valid.

If the computer determines that the passcode is not valid for accessing the decentralized service, no output of step 504, then the computer fails authentication of the user (step 506). In response to failing authentication of the user, the computer denies access to the decentralized service by the user (step 508). Thereafter, the process terminates.

If the computer determines that the passcode is valid for accessing the decentralized service, yes output of step 504, then the computer retrieves a most recent user authentication credit block corresponding to the user that was generated within a last defined time interval and unexpired from a blockchain (step 510). The computer makes a determination as to whether a number of accrued authentication credits contained in the most recent user authentication credit block corresponding to the user is greater than or equal to a number of authentication credits needed to access the decentralized service (step 512).

If the computer determines that the number of accrued authentication credits contained in the most recent user authentication credit block corresponding to the user is greater than or equal to the number of authentication credits needed to access the decentralized service, yes output of step 512, then the computer authenticates the user to access the decentralized service (step 514). In response to authenticating the user, the computer allows the access to the decentralized service by the user (step 516). Thereafter, the process terminates. It should be noted that the computer utilizes references, such as, for example, references 410 in FIG. 4, in the most recent user authentication credit block corresponding to the user to determine user secret blocks that were referenced and already used to previously authenticate the user by decentralized services, or used to determine user secret blocks that were not referenced and thus not previously used to authenticate the user.

If the computer determines that the number of accrued authentication credits contained in the most recent user authentication credit block corresponding to the user is not greater than or equal to (i.e., is less than) the number of authentication credits needed to access the decentralized service, no output of step 512, then the computer makes a determination as to whether a set of unprocessed and unexpired user secret blocks generated within the last defined time interval corresponding to the user exists in the blockchain that was not previously used to authenticate the user (step 518). If the computer determines that a set of unprocessed and unexpired user secret blocks generated within the last defined time interval corresponding to the user does not exist in the blockchain that was not previously used to authenticate the user, no output of step 518, then the process returns to step 506 where the computer fails authentication of the user.

If the computer determines that a set of unprocessed and unexpired user secret blocks generated within the last defined time interval corresponding to the user does exist in the blockchain that was not previously used to authenticate the user, yes output of step 518, then the computer retrieves a most recent user secret block of the set of unprocessed and unexpired user secret blocks generated within the last defined time interval corresponding to the user from the blockchain that is not referenced in the user authentication credit block corresponding to the user (step 520). The computer challenges the user using a question and answer pair contained in the most recent user secret block of the set of unprocessed and unexpired user secret blocks generated within the last defined time interval corresponding to the user retrieved from the blockchain (step 522). Afterward, the computer makes a determination as to whether the user successfully passed the challenge using the question and answer pair contained in the most recent user secret block of the set of unprocessed and unexpired user secret blocks generated within the last defined time interval corresponding to the user (step 524).

If the computer determines that the user did successfully pass the challenge using the question and answer pair contained in the most recent user secret block of the set of unprocessed user and unexpired user secret blocks generated within the last defined time interval corresponding to the user, yes output of step 524, then the computer generates a new user authentication credit block in the blockchain referencing all user secret blocks used to authenticate the user and including all accrued authentication credits corresponding to the user successfully passing the challenge (step 526). Thereafter, the process returns to step 514 where the computer authenticates the user to access the decentralized service.

If the computer determines that the user did not successfully pass the challenge using the question and answer pair contained in the most recent user secret block of the set of unprocessed and unexpired user secret blocks generated within the last defined time interval corresponding to the user, no output of step 524, then the computer makes a determination as to whether a defined number of user challenge failures (e.g., 3 user challenge failures) has been met (step 528). If the computer determines that the defined number of user challenge failures has been met, yes output of step 528, then the process returns to step 506 where the computer fails authentication of the user. If the computer determines that the defined number of user challenge failures has not been met, no output of step 528, then the computer makes a determination as to whether another user secret block exists in the set of unprocessed and unexpired user secret blocks generated within the last defined time interval (step 530). If the computer determines that another user secret block does not exist in the set of unprocessed and unexpired user secret blocks generated within the last defined time interval, no output of step 530, then the process returns to step 506 where the computer fails authentication of the user. If the computer determines that another user secret block does exist in the set of unprocessed and unexpired user secret blocks generated within the last defined time interval, yes output of step 530, then the process returns to step 520 where the computer retrieves a second most recent user secret block of the set of unprocessed and unexpired user secret blocks generated within the last defined time interval corresponding to the user from the blockchain.

Figure 6:
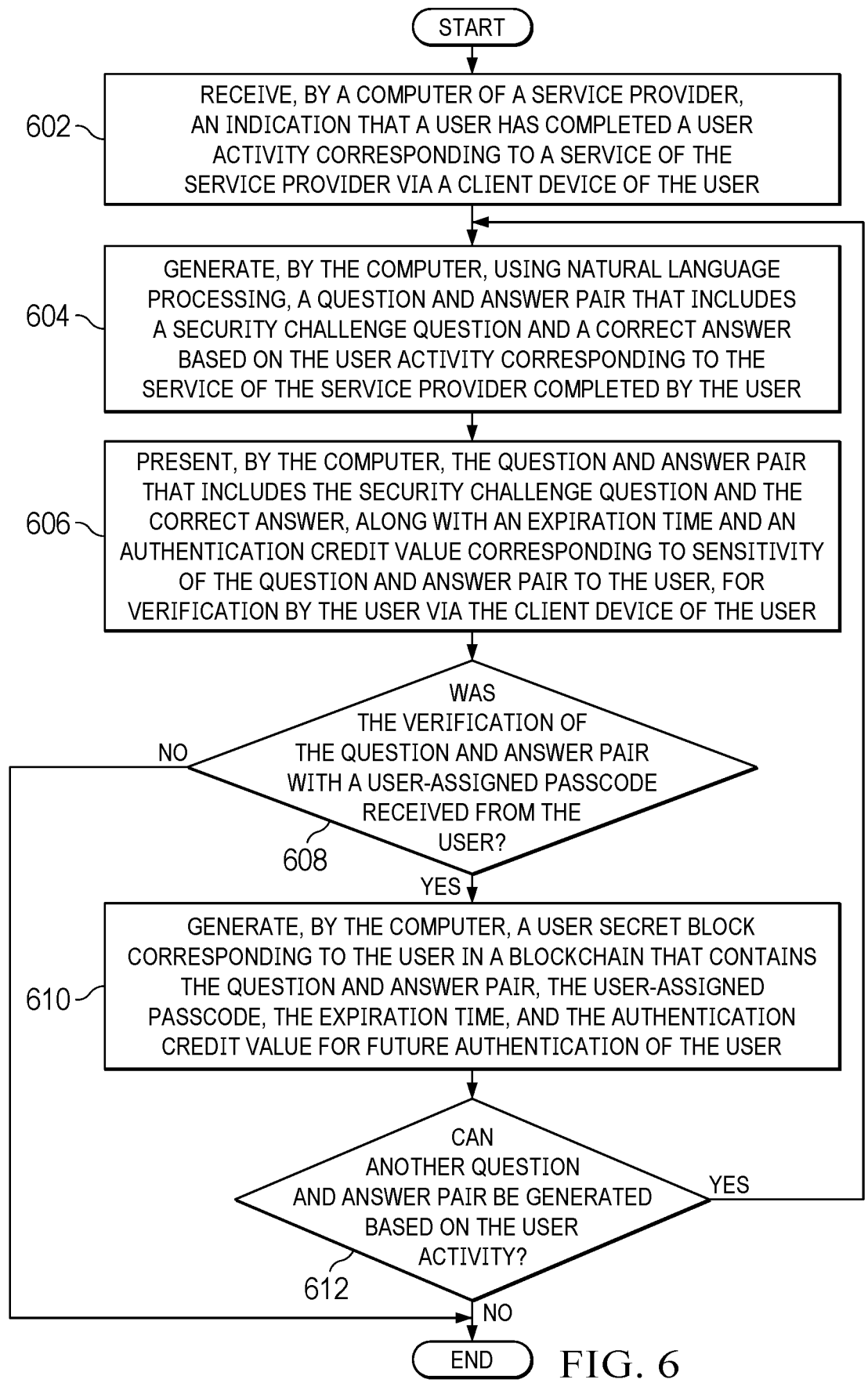
FIG. 6 is a flowchart illustrating a process for generating user secret blocks in accordance with an illustrative embodiment.

With reference now to FIG. 6, a flowchart illustrating a process for generating user secret blocks is shown in accordance with an illustrative embodiment. The process shown in FIG. 6 may be implemented in a computer, such as, for example, computer 101 in FIG. 1. For example, the process shown in FIG. 6 may be implemented in user authentication code 200 in FIG. 1.

The process begins when the computer of a service provider receives an indication that a user has completed a user activity corresponding to a service of the service provider via a client device of the user (step 602). It should be noted that the service of the service provider may be a traditional centralized service (e.g., a bank transfer) or a decentralized service (e.g., gold level service 224 in FIG. 2) from Web3. In response to receiving the indication that the user has completed the user activity, the computer, using natural language processing, generates a question and answer pair that includes a security challenge question and a correct answer based on the user activity corresponding to the service of the service provider completed by the user (step 604).

The computer presents the question and answer pair that includes the security challenge question and the correct answer, along with an expiration time and an authentication credit value corresponding to sensitivity of the question and answer pair to the user, for verification by the user via the client device of the user (step 606). The computer makes a determination as to whether the verification of the question and answer pair with a user-assigned passcode was received from the user (step 608).

If the computer determines that the verification of the question and answer pair with the user-assigned passcode was not received from the user, no output of step 608, then the process terminates thereafter. If the computer determines that the verification of the question and answer pair with the user-assigned passcode was received from the user, yes output of step 608, then the computer generates a user secret block corresponding to the user in a blockchain that contains the question and answer pair, the user-assigned passcode, the expiration time, and the authentication credit value for future authentication of the user (step 610). In addition, the computer makes a determination as to whether another question and answer pair can be generated based on the user activity (step 612). If the computer determines that another question and answer pair can be generated based on the user activity, yes output of step 612, then the process returns to step 604 where the computer, using natural language processing, generates another question and answer pair based on the user activity. If the computer determines that another question and answer pair cannot be generated based on the user activity, no output of step 612, then the process terminates thereafter.

Thus, illustrative embodiments of the present disclosure provide a computer-implemented method, computer system, and computer program product for performing user authentication to decentralized services using information contained in a private blockchain. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for user authentication, the computer-implemented method comprising:
retrieving, by a computer, a most recent user secret block of a set of unprocessed and unexpired user secret blocks generated within a last defined time interval corresponding to a user from a blockchain;
challenging, by the computer, the user using a question and answer pair contained in the most recent user secret block of the set of unprocessed and unexpired user secret blocks generated within the last defined time interval corresponding to the user retrieved from the blockchain;
determining, by the computer, whether the user successfully passed the challenge using the question and answer pair contained in the most recent user secret block of the set of unprocessed and unexpired user secret blocks generated within the last defined time interval corresponding to the user;
authenticating, by the computer, the user to access a decentralized service in response to the computer determining that the user did successfully pass the challenge using the question and answer pair contained in the most recent user secret block of the set of unprocessed and unexpired user secret blocks generated within the last defined time interval corresponding to the user; and
allowing, by the computer, the user to access the decentralized service in response to the computer authenticating the user.

2. The computer-implemented method of claim 1, further comprising:
receiving, by the computer of the decentralized service, a request with a passcode to access the decentralized service from a client device of the user; and
determining, by the computer, whether the passcode is valid for accessing the decentralized service.

3. The computer-implemented method of claim 2, further comprising:
failing, by the computer, authentication of the user in response to the computer determining that the passcode is not valid for accessing the decentralized service; and
denying, by the computer, access to the decentralized service by the user in response to the computer failing authentication of the user.

4. The computer-implemented method of claim 2, further comprising:
retrieving, by the computer, a most recent user authentication credit block corresponding to the user that was generated within the last defined time interval and unexpired from the blockchain in response to the computer determining that the passcode is valid for accessing the decentralized service.

5. The computer-implemented method of claim 4, further comprising:
determining, by the computer, whether a number of accrued authentication credits contained in the most recent user authentication credit block corresponding to the user is greater than or equal to a number of authentication credits needed to access the decentralized service; and
authenticating, by the computer, the user to access the decentralized service in response to the computer determining that the number of accrued authentication credits contained in the most recent user authentication credit block corresponding to the user is greater than or equal to the number of authentication credits needed to access the decentralized service.

6. The computer-implemented method of claim 5, further comprising:
determining, by the computer, whether the set of unprocessed and unexpired user secret blocks generated within the last defined time interval corresponding to the user exists in the blockchain that was not previously used to authenticate the user in response to the computer determining that the number of accrued authentication credits contained in the most recent user authentication credit block corresponding to the user is not greater than or equal to the number of authentication credits needed to access the decentralized service; and
retrieving, by the computer, the most recent user secret block of the set of unprocessed and unexpired user secret blocks generated within the last defined time interval corresponding to the user from the blockchain that is not referenced in the most recent user authentication credit block corresponding to the user in response to the computer determining that the set of unprocessed and unexpired user secret blocks generated within the last defined time interval corresponding to the user does exist in the blockchain that was not previously used to authenticate the user.

7. The computer-implemented method of claim 1, further comprising:
generating, by the computer, a new user authentication credit block in the blockchain referencing all user secret blocks used to authenticate the user and including all accrued authentication credits corresponding to the user successfully passing the challenge.

8. The computer-implemented method of claim 1, further comprising:
receiving, by the computer of a service provider, an indication that the user has completed a user activity corresponding to a service of the service provider via a client device of the user; and generating, by the computer, using natural language processing, the question and answer pair that includes a security challenge question and a correct answer based on the user activity corresponding to the service of the service provider completed by the user in response to the computer receiving the indication that the user has completed the user activity.

9. The computer-implemented method of claim 1, further comprising:
presenting, by the computer, the question and answer pair that includes a security challenge question and a correct answer, along with an expiration time and an authentication credit value corresponding to sensitivity of the question and answer pair to the user, for verification by the user via a client device of the user.

10. The computer-implemented method of claim 1, further comprising:
determining, by the computer, whether verification of the question and answer pair with a user-assigned passcode was received from the user; and
generating, by the computer, a user secret block corresponding to the user in the blockchain that contains the question and answer pair, the user-assigned passcode, an expiration time, and an authorization credit value in response to the computer determining that the verification of the question and answer pair with the user-assigned passcode was received from the user.

11. A computer system for user authentication, the computer system comprising:
a communication fabric;
a set of computer-readable storage media connected to the communication fabric, wherein the set of computer-readable storage media collectively stores program instructions; and
a set of processors connected to the communication fabric, wherein the set of processors executes the program instructions to:
retrieve a most recent user secret block of a set of unprocessed and unexpired user secret blocks generated within a last defined time interval corresponding to a user from a blockchain;
challenge the user using a question and answer pair contained in the most recent user secret block of the set of unprocessed and unexpired user secret blocks generated within the last defined time interval corresponding to the user retrieved from the blockchain;
determine whether the user successfully passed the challenge using the question and answer pair contained in the most recent user secret block of the set of unprocessed and unexpired user secret blocks generated within the last defined time interval corresponding to the user;
authenticate the user to access a decentralized service in response to determining that the user did successfully pass the challenge using the question and answer pair contained in the most recent user secret block of the set of unprocessed and unexpired user secret blocks generated within the last defined time interval corresponding to the user; and
allow the user to access the decentralized service in response to authenticating the user.

12. The computer system of claim 11, wherein the set of processors further executes the program instructions to:
receive a request with a passcode to access the decentralized service from a client device of the user; and
determine whether the passcode is valid for accessing the decentralized service.

13. The computer system of claim 12, wherein the set of processors further executes the program instructions to:
fail authentication of the user in response to determining that the passcode is not valid for accessing the decentralized service; and
deny access to the decentralized service by the user in response to failing authentication of the user.

14. The computer system of claim 12, wherein the set of processors further executes the program instructions to:
retrieve a most recent user authentication credit block corresponding to the user that was generated within the last defined time interval and unexpired from the blockchain in response to determining that the passcode is valid for accessing the decentralized service.

15. The computer system of claim 14, wherein the set of processors further executes the program instructions to:
determine whether a number of accrued authentication credits contained in the most recent user authentication credit block corresponding to the user is greater than or equal to a number of authentication credits needed to access the decentralized service; and
authenticate the user to access the decentralized service in response to determining that the number of accrued authentication credits contained in the most recent user authentication credit block corresponding to the user is greater than or equal to the number of authentication credits needed to access the decentralized service.

16. A computer program product for user authentication, the computer program product comprising a set of computer-readable storage media having program instructions collectively stored therein, the program instructions executable by a computer to cause the computer to:
retrieve a most recent user secret block of a set of unprocessed and unexpired user secret blocks generated within a last defined time interval corresponding to a user from a blockchain;
challenge the user using a question and answer pair contained in the most recent user secret block of the set of unprocessed and unexpired user secret blocks generated within the last defined time interval corresponding to the user retrieved from the blockchain;
determine whether the user successfully passed the challenge using the question and answer pair contained in the most recent user secret block of the set of unprocessed and unexpired user secret blocks generated within the last defined time interval corresponding to the user;
authenticate the user to access a decentralized service in response to determining that the user did successfully pass the challenge using the question and answer pair contained in the most recent user secret block of the set of unprocessed and unexpired user secret blocks generated within the last defined time interval corresponding to the user; and
allow the user to access the decentralized service in response to authenticating the user.

17. The computer program product of claim 16, wherein the program instructions further cause the computer to:
receive a request with a passcode to access the decentralized service from a client device of the user; and
determine whether the passcode is valid for accessing the decentralized service.

18. The computer program product of claim 17, wherein the program instructions further cause the computer to:
fail authentication of the user in response to determining that the passcode is not valid for accessing the decentralized service; and deny access to the decentralized service by the user in response to failing authentication of the user.

19. The computer program product of claim 17, wherein the program instructions further cause the computer to:
retrieve a most recent user authentication credit block corresponding to the user that was generated within the last defined time interval and unexpired from the blockchain in response to determining that the passcode is valid for accessing the decentralized service.

20. The computer program product of claim 19, wherein the program instructions further cause the computer to:
determine whether a number of accrued authentication credits contained in the most recent user authentication credit block corresponding to the user is greater than or equal to a number of authentication credits needed to access the decentralized service; and
authenticate the user to access the decentralized service in response to determining that the number of accrued authentication credits contained in the most recent user authentication credit block corresponding to the user is greater than or equal to the number of authentication credits needed to access the decentralized service.

* * * * *